(12) United States Patent
Pokam et al.

(10) Patent No.: US 11,928,472 B2
(45) Date of Patent: Mar. 12, 2024

(54) BRANCH PREFETCH MECHANISMS FOR MITIGATING FRONTEND BRANCH RESTEERS

(71) Applicant: Intel Corporation, Santa Clara, CA (US)

(72) Inventors: Gilles Pokam, Livermore, CA (US); Jared Warner Stark, IV, Portland, OR (US); Niranjan Kumar Soundararajan, Bengaluru (IN); Oleg Ladin, Kaliningrad (RU)

(73) Assignee: Intel Corporation, Santa Clara, CA (US)

( * ) Notice: Subject to any disclaimer, the term of this patent is extended or adjusted under 35 U.S.C. 154(b) by 620 days.

(21) Appl. No.: 17/033,771

(22) Filed: Sep. 26, 2020

(65) Prior Publication Data

US 2022/0100520 A1 Mar. 31, 2022

(51) Int. Cl.
*G06F 9/30* (2018.01)
*G06F 9/38* (2018.01)
*G06F 12/0875* (2016.01)

(52) U.S. Cl.
CPC .......... *G06F 9/3806* (2013.01); *G06F 9/3802* (2013.01); *G06F 9/3814* (2013.01);
(Continued)

(58) Field of Classification Search
CPC .... G06F 9/3806; G06F 9/3802; G06F 9/3814; G06F 9/383; G06F 9/3844;
(Continued)

(56) References Cited

U.S. PATENT DOCUMENTS

| | | | |
|---|---|---|---|
| 4,352,869 | A | 10/1982 | Mellors |
| 4,415,969 | A | 11/1983 | Bayliss et al. |

(Continued)

FOREIGN PATENT DOCUMENTS

| | | |
|---|---|---|
| CN | 114942722 A | 8/2022 |
| CN | 115904504 A | 4/2023 |

(Continued)

OTHER PUBLICATIONS

International Search Report (PCT/US2022/037037), daetd Oct. 27, 2022, 4 pages.

(Continued)

*Primary Examiner* — Corey S Faherty
(74) *Attorney, Agent, or Firm* — Spectrum IP Law Group LLC

(57) ABSTRACT

Methods and apparatus relating to branch prefetch mechanisms for mitigating front-end branch resteers are described. In an embodiment, predecodes an entry in a cache to generate a predecoded branch operation. The entry is associated with a cold branch operation, where the cold branch operation corresponds to an operation that is detected for a first time after storage in an instruction cache and wherein the cold branch operation remains undecoded since it is stored at a location in a cache line prior to a subsequent location of a branch operation in the cache line. The predecoded branch operation is stored in a Branch Prefetch Buffer (BPB) in response to a cache line fill operation of the cold branch operation in an instruction cache. Other embodiments are also disclosed and claimed.

20 Claims, 9 Drawing Sheets

(52) U.S. Cl.
CPC .............. *G06F 9/382* (2013.01); *G06F 9/383* (2013.01); *G06F 9/3844* (2013.01); *G06F 12/0875* (2013.01); *G06F 9/30145* (2013.01); *G06F 2212/452* (2013.01)

(58) Field of Classification Search
CPC ............. G06F 12/0875; G06F 9/30145; G06F 2212/452; G06F 9/30054; G06F 9/382
See application file for complete search history.

(56) References Cited

U.S. PATENT DOCUMENTS

| | | |
|---|---|---|
| 5,506,073 A | 4/1996 | Angell et al. |
| 5,714,279 A | 2/1998 | Zajac, Jr. et al. |
| 6,009,488 A | 12/1999 | Kavipurapu |
| 6,560,693 B1 | 5/2003 | Puzak et al. |
| 6,625,694 B2 | 9/2003 | Masri et al. |
| 6,678,847 B1 | 1/2004 | Perry et al. |
| 6,687,789 B1 | 2/2004 | Keller et al. |
| 6,766,442 B1 | 7/2004 | Kahle et al. |
| 6,779,036 B1 | 8/2004 | Deshpande |
| 6,826,651 B2 | 11/2004 | Michael et al. |
| 7,017,011 B2 | 3/2006 | Lesmanne et al. |
| 7,096,323 B1 | 8/2006 | Conway et al. |
| 7,844,053 B2 | 11/2010 | Crispin et al. |
| 8,041,898 B2 | 10/2011 | Moga et al. |
| 8,392,665 B2 | 3/2013 | Moga et al. |
| 8,539,212 B1 | 9/2013 | Kang et al. |
| 9,160,034 B2 | 10/2015 | Kato et al. |
| 9,164,900 B1 | 10/2015 | Schuttenberg |
| 9,519,773 B2 | 12/2016 | Patel et al. |
| 9,940,138 B2 | 4/2018 | Lopez et al. |
| 10,008,735 B2 | 6/2018 | Ohtomo et al. |
| 2002/0078331 A1 | 6/2002 | Ju et al. |
| 2002/0103979 A1 | 8/2002 | Koga |
| 2002/0116662 A1 | 8/2002 | Hofstee et al. |
| 2003/0023836 A1 | 1/2003 | Catherwood et al. |
| 2003/0041212 A1 | 2/2003 | Creta et al. |
| 2003/0149865 A1 | 8/2003 | Kadambi |
| 2003/0163649 A1 | 8/2003 | Kapur et al. |
| 2004/0078558 A1 | 4/2004 | Sprangle |
| 2004/0151986 A1 | 8/2004 | Park et al. |
| 2005/0125640 A1 | 6/2005 | Ford et al. |
| 2005/0198187 A1 | 9/2005 | Tierney et al. |
| 2005/0198479 A1* | 9/2005 | Bean .................... G06F 9/3802 712/237 |
| 2006/0101209 A1 | 5/2006 | Lais et al. |
| 2006/0143408 A1 | 6/2006 | Sistla |
| 2006/0294344 A1 | 12/2006 | Hsu et al. |
| 2007/0055826 A1 | 3/2007 | Morton et al. |
| 2007/0233932 A1 | 10/2007 | Collier et al. |
| 2008/0059710 A1 | 3/2008 | Handgen et al. |
| 2008/0162868 A1 | 7/2008 | Glew |
| 2009/0248989 A1 | 10/2009 | Chicheportiche et al. |
| 2009/0276581 A1 | 11/2009 | Moga et al. |
| 2010/0332762 A1 | 12/2010 | Moga et al. |
| 2011/0045355 A1 | 2/2011 | Ichikawa |
| 2011/0055523 A1* | 3/2011 | Kaplan .................. G06F 9/382 712/214 |
| 2012/0079214 A1 | 3/2012 | Moga et al. |
| 2012/0301796 A1 | 11/2012 | Ohtomo et al. |
| 2012/0308900 A1 | 12/2012 | Ogasa |
| 2013/0246709 A1 | 9/2013 | Segelken et al. |
| 2013/0295464 A1 | 11/2013 | Yanagi et al. |
| 2014/0195790 A1 | 7/2014 | Merten et al. |
| 2015/0147659 A1 | 5/2015 | Kato |
| 2016/0103232 A1 | 4/2016 | Ouspenski et al. |
| 2016/0149259 A1 | 5/2016 | Osada et al. |
| 2016/0156064 A1 | 6/2016 | Miyashita et al. |
| 2016/0204467 A1 | 7/2016 | Nogami et al. |
| 2016/0248119 A1 | 8/2016 | Kato |
| 2016/0268630 A1 | 9/2016 | Tsukada et al. |
| 2016/0308210 A1 | 10/2016 | Sakuda et al. |
| 2016/0359193 A1 | 12/2016 | Yi et al. |
| 2017/0024205 A1 | 1/2017 | Kountanis et al. |
| 2017/0040637 A1 | 2/2017 | Ceder et al. |
| 2017/0179481 A1 | 6/2017 | Yamada et al. |
| 2017/0187066 A1 | 6/2017 | Tsujimura et al. |
| 2017/0222257 A1 | 8/2017 | Miyashita et al. |
| 2017/0229734 A1 | 8/2017 | Furukawa et al. |
| 2017/0288281 A1 | 10/2017 | Chiang et al. |
| 2018/0095752 A1* | 4/2018 | Kudaravalli ........ G06F 12/0875 |
| 2018/0183065 A1 | 6/2018 | Sasaki |
| 2018/0269521 A1 | 9/2018 | Ohtomo et al. |
| 2018/0307438 A1 | 10/2018 | Huang et al. |
| 2019/0012267 A1 | 1/2019 | Scalabrino et al. |
| 2019/0042799 A1 | 2/2019 | Durham et al. |
| 2019/0067736 A1 | 2/2019 | Yoshioka et al. |
| 2019/0088995 A1 | 3/2019 | Asano et al. |
| 2019/0095389 A1 | 3/2019 | Barnes et al. |
| 2019/0097266 A1 | 3/2019 | Yamamoto et al. |
| 2019/0220284 A1 | 7/2019 | Gupta et al. |
| 2020/0089504 A1 | 3/2020 | Sheikh et al. |
| 2020/0125501 A1 | 4/2020 | Durham et al. |
| 2020/0125770 A1 | 4/2020 | LeMay et al. |
| 2020/0134417 A1 | 4/2020 | Mohapatra et al. |
| 2020/0159676 A1 | 5/2020 | Durham et al. |
| 2020/0212481 A1 | 7/2020 | Nagamine et al. |
| 2020/0228137 A1 | 7/2020 | Chinya et al. |
| 2020/0328454 A1 | 10/2020 | Sakai et al. |
| 2020/0328455 A1 | 10/2020 | Sakai et al. |
| 2020/0328457 A1 | 10/2020 | Sakai et al. |
| 2020/0328460 A1 | 10/2020 | Asano et al. |
| 2020/0328461 A1 | 10/2020 | Asano et al. |
| 2020/0328462 A1 | 10/2020 | Asano et al. |
| 2020/0328464 A1 | 10/2020 | Asano et al. |
| 2020/0328465 A1 | 10/2020 | Sakaida et al. |
| 2020/0328468 A1 | 10/2020 | Sakaida et al. |
| 2020/0328469 A1 | 10/2020 | Asano et al. |
| 2020/0335817 A1 | 10/2020 | Asano et al. |
| 2020/0350615 A1 | 11/2020 | Sakaida et al. |
| 2020/0350622 A1 | 11/2020 | Sakaida et al. |
| 2020/0371811 A1* | 11/2020 | Govindan ............. G06F 9/3816 |
| 2020/0379902 A1 | 12/2020 | Durham et al. |
| 2020/0393557 A1 | 12/2020 | Manneschi |
| 2020/0410327 A1 | 12/2020 | Chinya et al. |
| 2021/0004233 A1* | 1/2021 | Kumar .................. G06F 9/3858 |
| 2021/0042617 A1 | 2/2021 | Chinya et al. |
| 2021/0096861 A1 | 4/2021 | Wang et al. |
| 2021/0117197 A1 | 4/2021 | Hsu et al. |
| 2021/0200546 A1 | 7/2021 | LeMay et al. |
| 2021/0326139 A1 | 10/2021 | Gupta et al. |
| 2021/0357222 A1 | 11/2021 | Nair et al. |
| 2022/0058023 A1 | 2/2022 | LeMay et al. |
| 2022/0091852 A1 | 3/2022 | Gupta et al. |
| 2022/0100520 A1 | 3/2022 | Pokam et al. |
| 2022/0261509 A1 | 8/2022 | LeMay et al. |
| 2023/0056699 A1 | 2/2023 | Subramaniam et al. |
| 2023/0091205 A1 | 3/2023 | Moga et al. |
| 2023/0195388 A1 | 6/2023 | Butera et al. |
| 2023/0214325 A1 | 7/2023 | Shukla et al. |
| 2023/0315473 A1* | 10/2023 | Azeem .................. G06F 9/382 712/213 |

FOREIGN PATENT DOCUMENTS

| | | |
|---|---|---|
| CN | 116266122 A | 6/2023 |
| CN | 116400960 A | 7/2023 |
| EP | 0354774 A2 | 2/1990 |
| EP | 0354774 A3 | 8/1992 |
| EP | 2508985 A1 | 10/2012 |
| EP | 4044027 A2 | 8/2022 |
| EP | 4141654 A1 | 3/2023 |
| EP | 4198717 A1 | 6/2023 |
| EP | 4209915 A1 | 7/2023 |
| GB | 2599006 A | 3/2022 |
| TW | 202328926 A | 7/2023 |
| WO | 2012040731 A2 | 3/2012 |
| WO | 2012040731 A3 | 6/2012 |
| WO | 2021162792 A1 | 8/2021 |
| WO | 2022139850 A1 | 6/2022 |

(56) References Cited

OTHER PUBLICATIONS

Shuwen Deng et al., "Leaky Frontends: Micro-Op Cache and Processor Frontend Vulnerabilities," arXiv:2105.12224v1. May 25, 2021, pp. 1-13. [See, e.g., PCT ISR, highlighting pp. 3-4 and figure 1.].

Written Opinion of the International Searching Authority, dated Oct. 28, 2022, 7 pages.

Extended European Search Report for application No. 22208089.7, dated Apr. 28, 2023, 7 pages.

Sinharoy, B et al. "IBM POWER8 processor core microarchitecture," IBM J. Res. & Dev., vol. 59, No. 1, Paper 2, Jan./Feb. 2015, pp. 2:1 to 2:21.

Kumar, Rakesh, et al. "Blasting Through the Front-End Bottleneck with Shotgun," Proceedings of ACM International Conference on Architectural Support for Programming Languages and Operating Systems (ASPLOS '18), New York, NY, 13 pages.

Henriquez, Rachel (ed.), "IBM Journal of Research and Development," Issue 45, Jul.-Sep. 2015, retrieved from http://ieeexplore.ieee.org/xpl/tocresult.jsp?isnumber=7175088 on Aug. 24, 2020, 6 pages.

Adiga, Narasimha, et al. "The IBM z15 High Frequency mainframe Branch Predictor," 2020 ACM/IEEE 47th Annual Symposium on Computer Architecture (ISCA), 13 pages.

Bonanno, James, et al. "Two-Level Bulk Preload Branch Prediction," 2013 IEEE 19th International Symposium on High Performance Computer Architecture (HPCA), Shenzen, China, 2013, pp. 71-82.

Shum, C., et al. "Design and microarchitecture of the IBM System z10 microprocessor," IBM J. Res. & Dev., vol. 53, No. 1, Paper 1, 2009, pp. 1:1 to 1:12.

Burcea, Ioana, et al. "Phantom-BTB: A Virtualized Branch Target Buffer Design," ACM SIGARCH Computer Architecture News, Mar. 2009, 11 pages.

Farooq, M. Umar, and Lizy K. John. "Store-load-branch (slb) predictor: A compiler assisted branch prediction for data dependent branches." High Performance Computer Architecture (HPCA2013), 2013 IEEE 19th International Symposium on. IEEE, 2013.

Gao, et al. "Address-branch correlation: A novel locality for long latency hard-to-predict branches," High Performance Computer Architecture, HPCA 2008, IEEE 14th International Symposium, Piscataway, New Jersey (Feb. 16, 2008).

M. Al-Otoom, E. Forbes, and E. Rotenberg, "Exact: explicit dynamic branch prediction with active updates," in Proceedings of the 7th ACM international conference on Computing frontiers. ACM, 2010, pp. 165-176.

Office Action dated Apr. 4, 2022 for Dutch Patent Application No. 20228988.

Sheikh, Rami, James Tuck, and Eric Rotenberg. "Control-flow decoupling." Proceedings of the 2012 45th Annual IEEE/ACM International Symposium on Microarchitecture. IEEE Computer Society, 2012.

Sheikh, Rami, James Tuck, and Eric Rotenberg. "Control-Flow Decoupling: An Approach for Timely, Non-speculative Branching," IEEE Transactions on Computers, Oct. 2014.

B. Sinharoy et al. "IBM POWER8 processor core microarchitecture," IBM J. Res. & Dev. vol. 59 No. 1 Paper 2 Jan./Feb. 2015, 21 pages.

C.-L. K. Shum et al., "Design and microarchitecture of the IBM System z10 microprocessor," IBM J. Res. & Dev. vol. 53 No. 1 Paper 1 2009, 12 pages.

IBM T. J. Watson Research Center, "IBM T. J. Watson Research Center," downloaded from https://ieeexplore.ieee.org/pl/tocresult.jsp?isnumber=7175088 on Aug. 24, 2020, 6 pages.

HPC Cluster Tuning on 3rd Generation Intel Xeon Scalable Processors, Intel Optimization Guide, High Performance Computing Intel Xeon Scalable Processor, 10 pages.

Intel Select Solutions for HPC & AI Converged Clusters [Magpie*], Solution Brief, Intel Select Solutions High Solutions High Performance Computing and AI, May 2019.

Jouppi et al. "In-Datacenter Performance Analysis of a Tensor Processing Unit," 2017 ACM/IEEE 44th Annual International Symposium on Computer Architecture (ISCA), Toronto, ON, 2017, 12 pages.

Spec CPU2006 Platform Settings for Lenovo Systems, 3 pages.

U.S. Appl. No. 17/409,090, filed Aug. 23, 2021, Kameswar Subramaniam.

European Search Report for European Patent Application No. 22 183 309.8, dated Dec. 23, 2022, 11 pages.

Alves et al., "Early Address Prediction: Efficient Pipeline Prefetch and Reuse," ACM Transactions on Architecture and Code Optimization, vol. 18, No. 3, Jun. 8, 2021, 22 pages.

European Search Report for application No. EP 22206883, dated Jun. 12, 2023, 11 pages.

International Search Report for PCT/US2011/053317, published Mar. 29, 2012, 4 pages.

U.S. Appl. No. 11/216,366, filed Jan. 4, 2022, Durham et al.

U.S. Appl. No. 17/555,174, filed Dec. 17, 2021, William Butera.

U.S. Appl. No. 17/957,977, filed Sep. 30, 2022, Sudhanshu Shukla.

Chen et al., "Using Dataflow To Optimize Energy Efficiency of Deep Neural Network Accelerators," IEEE Micro, IEEE Computer Society, May/Jun. 2017, 10 pages.

Chen et al. "Eyeriss: An Energy-Efficient Reconfigurable Accelerator for Deep Convolutional Neural Networks," in SSCC 2016, IEEE International Solid-State Circuits Conference, Jan. 31-Feb. 4, 2016, 4 pages.

Sudhanshu Shukla et al., "Register File Prefetching," International Symposium on Computer Architecture (ISCA 22). ACM, NewYork, NY, USA, Jun. 18-22, 2022, published Jun. 11, 2022, 14 pages.

GB Examination Report and Notification of Intention to Grant counterpart GB application GB21111963.1, dated Jun. 28, 2022, 2 pages.

Notice of Allowance from application No. 2028988 filed in NL, dated Jul. 29, 2022, 1 page (including Google machine translation). together with allowed claims in English, 3 pages.

Notice of Grant for counterpart GB application No. GB2599006, dated Sep. 13, 2022, 2 pages.

Notice of Grant from counterpart Dutch patent application under number under No. 2028988, Jul. 27, 2022, 5 pages [with Google Translation].

Chromium Blog: Efficient And Safe Allocations Everywhere!, downloaded from "https://blog.chromium.org/2021/04/efficient-and-safe-allocations-everyw," on Jun. 22, 2021, 6 pages.

Ioana Burcea et al., "Phantom-BTB: A Virtualized Branch Target Buffer Design," ASPLOS'09, Mar. 7-11, 2009, 11 pages.

James Bonanno et al., "Two Level Bulk Preload Branch Prediction," IEEE 978-1-4673-5587-2/13, 2013, 12 pages.

Narasimha Adiga et al, "The IBM z15 High Frequency Mainframe Branch Predictor," ACM/IEEE 47the International Symposium on Computer Architecture (ISCA), 2020, 13 pages.

Rakesh Kumar et al. "Blasting Through The Front-End Bottleneck With Shotgun," ASPLOS'18, Mar. 24-28, 2018, 13 pages.

Extended European Search Report, issued by the European Patent Office dated Oct. 19, 2022, 16 pages.

LeMay, Michael "BackupRefPtr Spatial Safety Extension," 8 pages, Feb. 2021.

MiraclePtr and *Scan—preventing exploitation of UaF bugs (BlinkOn 13).

Partial European Search Report, dated Jul. 12, 2022, for Application No. 22150649.6, 15 pages.

Ziad, Mohamed Tarek Ibn, "No-FAT: Architectural Support for Low Overhead Memory Safety Checks," Department of Computer Science, New York, NY, pp. 1-14.

\* cited by examiner

```
For(int outer=0;outer<1000;outer++)
{
    for(int i=0; i<1000; i++)
    {
        if((i<100) && (i>=50))
            fun1()
        else if(i<50)
            fun2()

if((i<200) && (i>=150))
            fun3()
        else if((i>=100) && (i<150))
            fun4()

if((i<300) && (i>=250))
            fun5()
        else if((i>=200) && (i<250))
            fun6()
        ...

if((i>=1950))
            fun19()
        else if((i>=1900) && (i<9150))
            fun20()
    }
}
```

```
ReverseBytesMarking(EntryBytePosition):
        N := 1
        while (EntryBytePosition - N) >= 0) {
            if (N == LengthIs[EntryBytePosition - N]) {
                if (isCallReturn(EntryBytePosition - N))
                    BRstart[EntryBytePosition - N] := 1
                ReverseBytesMarking(EntryBytePosition - N)
            }
            N ++;
        }
```

US 11,928,472 B2

BRANCH PREFETCH MECHANISMS FOR MITIGATING FRONTEND BRANCH RESTEERS

FIELD

The present disclosure generally relates to the field of electronics. More particularly, some embodiments relate to techniques for branch prefetch mechanisms for mitigating frontend branch resteers.

BACKGROUND

To improve performance, some processors utilize speculative processing (sometimes also referred to as Out-Of-Order (OOO) processors), which attempts to predict the future course of an executing program to speed its execution, for example, by employing parallelism. The predictions may or may not end up being correct. When they are correct, a program may execute in less time than when non-speculative processing is employed. When a prediction is incorrect, however, the processor has to resteer branch operations and recover its state to a point prior to the misprediction, which creates inefficiencies.

Moreover, despite recent advances in microprocessors design, achieving high single-thread performance, even in the multicore era, remains a major challenge. For emerging datacenter and cloud applications, a significant number of processor cycles (about 30%) are lost in the front-end engine of a processor, where a large fraction of it (about 35%) may be caused by branch resteers.

BRIEF DESCRIPTION OF THE DRAWINGS

So that the manner in which the herein recited features of the present embodiments can be understood in detail, a more particular description of the embodiments may be had by reference to embodiments, some of which are illustrated in the appended drawings. It is to be noted, however, that the appended drawings illustrate only typical embodiments and are therefore not to be considered limiting of their scope.

DETAILED DESCRIPTION

Figures 1, 2:
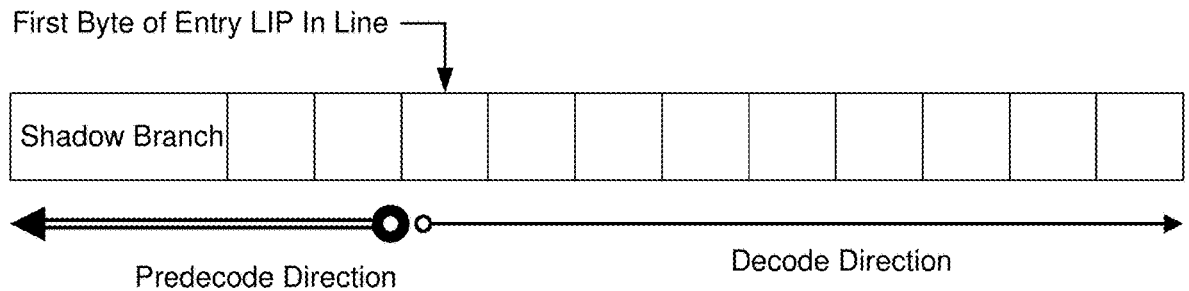
FIG. 1 illustrates a Shadow CALL for a branch operation in a cache line, according to an embodiment.
FIG. 2 illustrates a sample pseudocode for a microbenchmark to detect usage of a branch prefetch buffer, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, achieving high single-thread performance, even in the multicore era, remains a major challenge. For emerging datacenter and cloud applications, a significant number of processor cycles (about 30%) are lost in the front-end engine of a processor, where a large fraction of it (about 35%) may be caused by branch resteers. As discussed herein, a "branch resteer" generally refers to redirecting a pipeline towards the correct path, which may be due to branch misprediction. More particularly, a branch predictor guides the processor pipeline down a control flow path according to its predictions. Later in the pipeline, there are checks to make sure the predictions are correct. If they are incorrect, the pipeline upstream of where the check is made, needs to be flushed and then resteered to the correct control flow path. For the aforementioned emerging applications, the main challenge lies with their big code footprint and associated large number of jump targets that can easily feature millions of branches, far exceeding current Branch Target Buffer (BTB) sizes that can only host a few thousand jump targets. It is possible to increase the size of the BTB as well as add a hierarchy of BTBs, and prefetch from a higher level BTB into a lower level one. While the size/hierarchy of BTB can be increased to extend the jump targets, a larger/extended BTB would create other inefficiencies such as manufacturing costs, increasing footprint, and/or delays associated with searching a larger BTB.

To this end, some embodiments provide techniques for branch prefetch mechanisms for mitigating frontend branch resteers. More particularly, one or more embodiments provide a backward decode logic/mechanism for processors that have pre-decode bits. Another embodiment utilizes the pre-decode bits to pre-decode bytes in order to find branches for insertion into the BTB to avoid unnecessary resteers. Generally, a branch predictor unit/logic sits at the head of the processor pipeline and only has instruction addresses to process (i.e., it does not have instructions yet because those are only known downstream after the instruction bytes have been fetched and decoded). The Branch Target Buffer (or "BTB") is a cache that when queried with an instruction address will return whether that address has a branch associated with it. Additionally, it can also return other information about that branch needed for the branch predictor unit to do its work, such as the branch type (e.g., CALL, RETURN, or JUMP) and the branch's target that is predicted to be taken. The BTB may be added to the front-end of a processor (e.g., front end 830 of FIG. 8B) to assist in branch prediction operations.

Moreover, a sizeable fraction of branch resteers can be due to "cold" CALLs and RETURNs, i.e., CALLS or RETURNS that are seen for the first time, and hit the Instruction Cache (IC) but have not been decoded because they lie in the shadow of a branch that jumps in the middle of a cache line. To this end, in an embodiment, these "cold" branches are pre-decoded before an instruction cache fill occurs and the pre-decoded branch operations then inserted into a branch prefetch buffer (BPB). In some embodiments, the BPB can be looked up in parallel to a BTB access. In one embodiment, upon a BTB miss, the request can be serviced by BPB. In an embodiment, on a BPB hit, the entry is promoted into the BTB. Hence, in some embodiments, both the BTB and BPB can be accessed in parallel to discover if there is a branch at a particular address. If there is a hit in the BPB but a miss in the BTB, the branch is moved from the BPB to the BTB. The branch is added in the BPB first because it avoids polluting the BTB with incorrect prefetches. Once a hit in the BPB occurs for a given address, it indicates that the prefetch is correct and it can be moved to the BTB. This makes more space in the BPB, which is much smaller than the BTB.

As mentioned before, branch resteers are preponderantly caused by cold branches and dominate the frontend stalls in various applications. To this end, some embodiments significantly mitigates their impact without increasing the BTB size, and by introducing a negligible hardware estate for the associated logic and/or BPB.

Further, some embodiments may be applied in computing systems that include one or more processors (e.g., where the one or more processors may include one or more processor cores), such as those discussed with reference to FIG. 1 et seq., including for example a desktop computer, a work station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

FIG. 1 illustrates a Shadow CALL for a branch operation in a cache line, according to an embodiment. Without the embodiments discussed herein, CALLs or RETURNs in a shadow of a branch that jumps in the middle of a cache line are generally expected to miss the BTB the first time they are accessed. The reason why such shadow branches miss the BTB stems from the fact that they have not been decoded the first time the line was fetched, as decoding proceeds forward starting from the entry LIP's first byte in the line (where "LIP" refers to Linear Instruction Pointer or more generally referred to herein as "address"), i.e. the target of the branch (see FIG. 1). On the other hand, if these CALLs or RETURNs were to hit the BTB, then it would mean they have been predecoded and inserted into the BTB ahead of their first access. While one primary focus herein may be on CALLs and RETURNs (since they cause the most resteers), embodiments are not limited to these and other branch types can be identified in the same manner.

The insertion into the BTB would very likely happen via a staging buffer like BPB, which acts as a filter in some embodiments, since direct insertion into the BTB would pollute it significantly. As discussed herein, polluting the BTB refers to the situation where in some cases of prefetching the prefetching may not actually be needed and if the unnecessarily prefetched data is then inserted directly into the BTB, it would victimize another entry that would actually be needed. To test for this case, an embodiment involves writing a microbenchmark with a series of branches (CALL/RETURN) in the shadow of another branch on the same cache line as illustrated in FIG. 2.

More particularly, FIG. 2 illustrates a sample pseudocode for a microbenchmark to detect usage of a BPB, according to an embodiment. The example assumes branches in Fun1 and Fun2 are on the same cache line, same with branches in Fun3 and Fun4, etc. (e.g., in pairs). In an embodiment, when Fun1 (and respectively Fun3 and so on) executes, there is no expectation for branches in the shadow to cause a resteer, because they would have been brought in earlier. Without the embodiments discussed herein, these branches will cause a resteer.

While executing this microbenchmark on the final product, after each branch in Fun2 (respectively Fun4 and so on) has been referenced in the BTB, the microbenchmark will start referencing the shadow branches in Fun1 (respectively Fun3 and so on). Without the embodiments discussed herein, each unique static shadow branch would cause a resteer. But with it, resteers are only seen for the static branches in the series of branches in Fun2 (respectively Fun4 and so on). The number of branch resteers in this case could easily be measured using performance counter(s) in various implementations.

Figure 3:
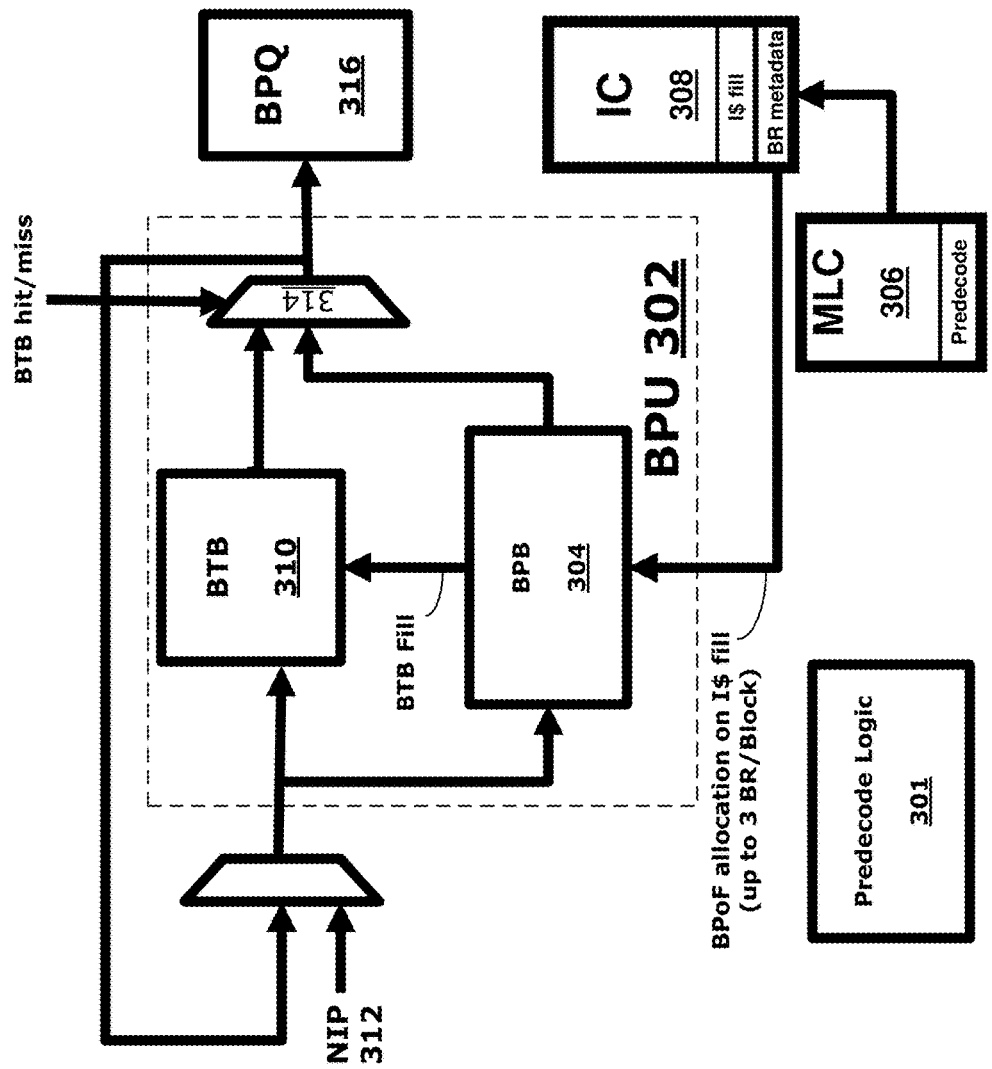
FIG. 3 illustrates a block diagram of various components of a processor that may be used to implement a branch prediction unit with a branch prefetch buffer, according to an embodiment.

FIG. 3 illustrates a block diagram of various components of a processor that may be used to implement a Branch Prediction Unit (BPU) 302 with a Branch Prefetch Buffer (BPB) 304, according to an embodiment. At least one embodiment provides a novel mechanism that reduces the number of frontend branch resteers, which may be caused predominantly by cold CALLs and/or RETURNs. However, embodiments are not limited to cold CALLs and/or RETURNs and resteers may be caused by other operations.

As shown in FIG. 3, a predecode algorithm/logic 301 is applied in the Mid-Level Cache 306 ("MLC" which may also be sometimes referred to as L2 or Level 2 cache) extracts cold branches from a cache line. In various embodiments, predecode logic 301 can perform one or more operations associated with predecoding and/or updating of the BPB, etc. such as discussed with reference to FIG. 3 for branch prefetch to mitigate frontend branch resteers. In various embodiments, the predecode logic 301 can be implemented as a dedicated logic or as part of existing components of a processor/core such as Branch Prediction logic 832 of FIG. 8B and/or processor components such as execution unit, etc. When a cache line (I$) fill occurs in the Instruction Cache (IC) 308, these branches are then subsequently prefetched into the BPB 304. This policy may be referred to herein as Branch-Prefetch-on-Fill (BPoF) which utilizes a (e.g., relatively small) cache, called the Branch Prefetch Buffer (BPB) 304. Both the BPB and the Branch Target Buffer (BTB) 310 are looked up in parallel in an embodiment. Upon a BTB miss, the request is serviced by BPB. On a BPB hit, the corresponding BPB entry may be promoted into the BTB.

Referring to FIG. 3, when a New Instruction Pointer (NIP) 312 (e.g., associated with a branch operation) is received, it is checked in both BPB 304 and Branch Target Buffer (BTB, which may sometimes be referred to as a Target Address (TA) buffer) 310 (e.g., in parallel), and the results fed to a multiplexer 314 which is controlled by a BTB hit/miss signal to provide an output to a Branch Prediction Queue (BPQ) 316.

Furthermore, when control flow changes to a new line, e.g., due to a branch, decoding proceeds onward from the entry address's first byte, i.e., the target of the branch. If the entry address's first byte is not at the beginning of the line, branches in the shadow of the entry address are not decoded and will miss the BTB when looked up the first time. About 60% of branch resteers on average seem to fall into this category. One way to retrieve these shadow branches before their first access in the BTB is to also decode the bytes backwards (as shown in FIG. 1), starting from the byte immediately preceding the entry address's first byte. This can be done for a branch miss-causing instruction (BMI), i.e., a predicted taken branch whose target misses the instruction cache 308, as it would provide enough time to predecode these branches and insert them into BPB before their first access.

By contrast, other techniques may do forward predecode, where they attempt to predecode all remaining bytes in a cache line once they know the entry point. Some embodiments however perform predecoding bytes in the reverse direction, i.e. from entry point to start of the cache line (see, e.g., FIG. 1 and as further discuss herein, for example, with reference to FIGS. 3 and/or 4).

Figure 8:
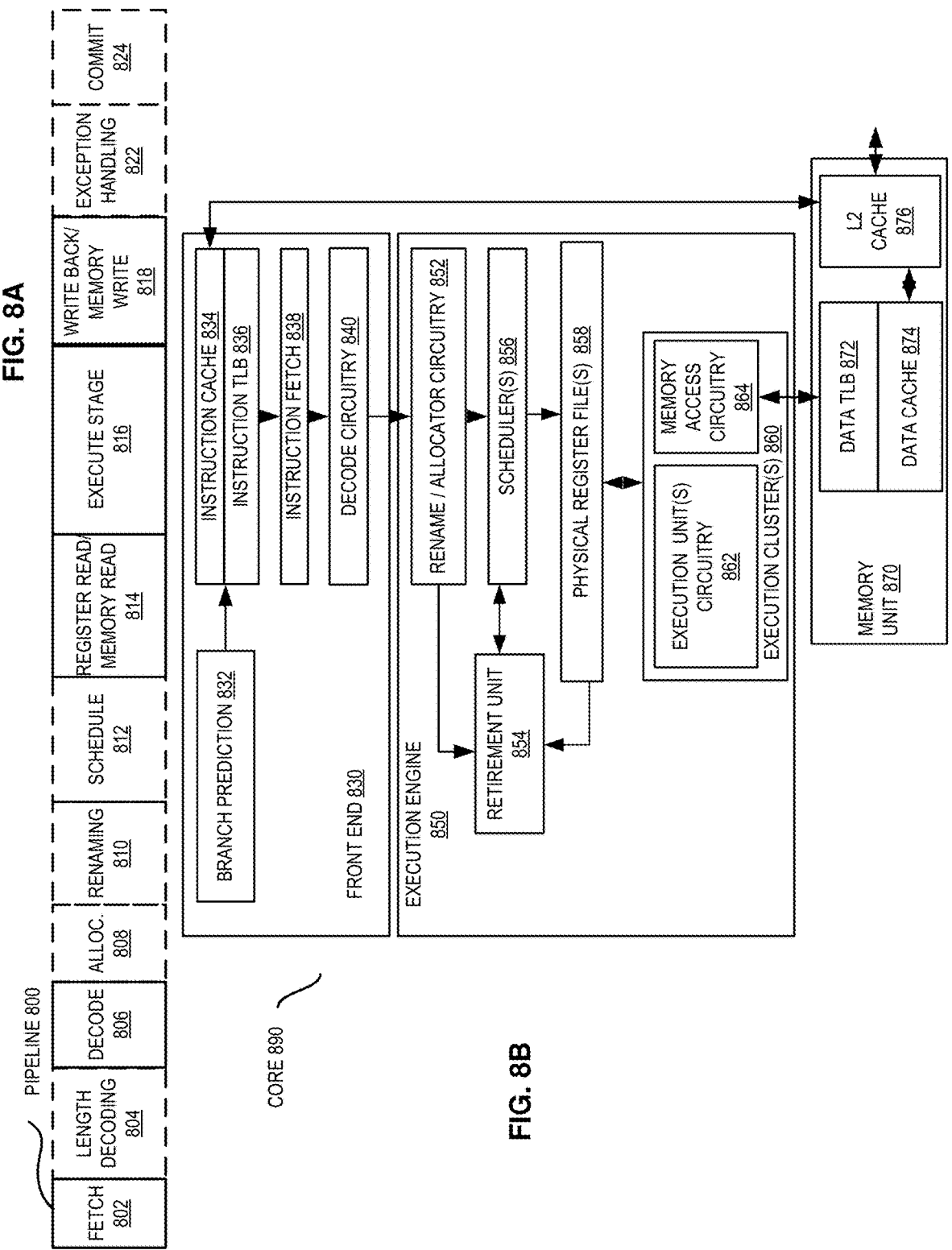
FIG. 8A is a block diagram illustrating both an exemplary in-order pipeline and an exemplary register renaming, out-of-order issue/execution pipeline according to embodiments.
FIG. 8B is a block diagram illustrating both an exemplary embodiment of an in-order architecture core and an exemplary register renaming, out-of-order issue/execution architecture core to be included in a processor according to embodiments.

Further, various components of FIG. 3 may be the same or similar to one or more components of FIG. 8B with the same/similar names, such as the branch prediction logic 832, front end 830, L2 cache 876, instruction cache 834, etc. Moreover, in an embodiment, the core 890 of FIG. 8B may be modified to incorporate the BPB.

Figures 4, 5:
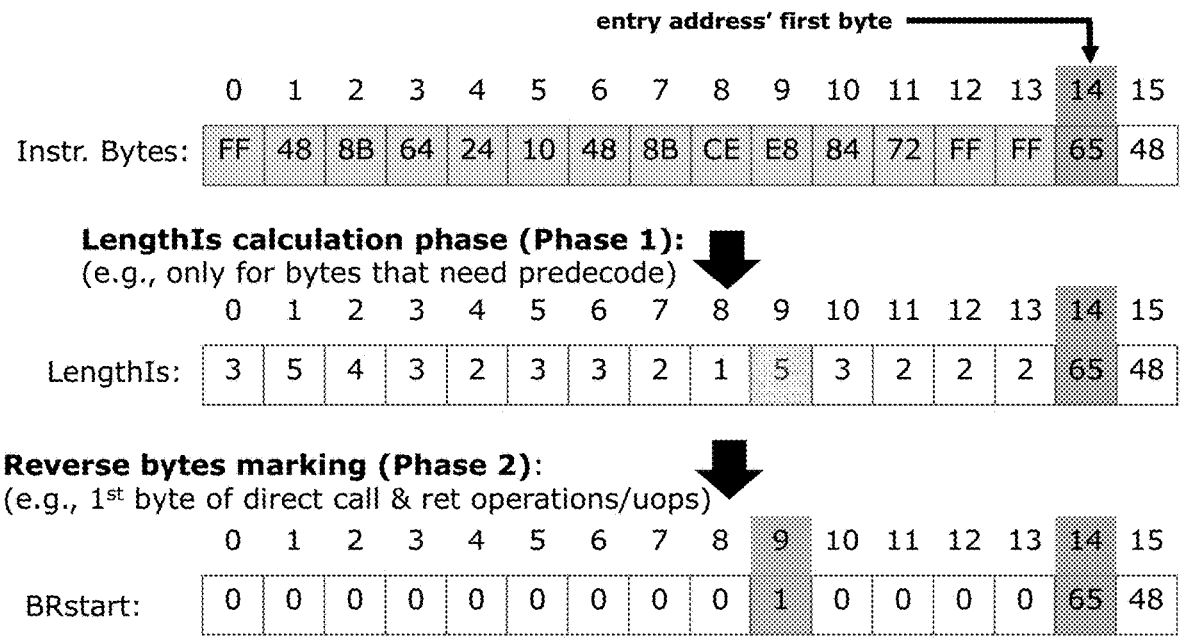
FIG. 4 illustrates sample data for a two-phase predecode algorithm, according to an embodiment.
FIG. 5 illustrates a sample pseudocode for a reverse bytes marking algorithm, according to an embodiment.

FIG. 4 illustrates sample data for a two-phase predecode algorithm, according to an embodiment. As shown, the predecode algorithm proceeds in two phases: the instruction length calculation phase and the reverse bytes marking phase. The instruction length calculation calculates the length in bytes of each potential instruction in the bytes stream, assuming each byte could be the start of a new instruction. This phase may be similar to instruction length decode (ILD) algorithm in some traditional Instruction Set Architecture (ISA) pipelines. In forward bytes marking, it is known that a-priori where decode starts (first byte of entry address) and information gathered from the instruction length calculation phase is used to reveal all the remaining instructions. In contrast, for the reverse bytes marking phase, it is known where decode ends (last byte preceding entry address's first byte) and information gathered from the instruction length calculation phase is used to expose shadow branches in all possible backward instruction chains.

Instruction length calculation assumes each byte leading up to the entry address's first byte could potentially be the start of an instruction and calculates its length accordingly. The result of the length calculation is the LengthIs vector as illustrated in the example shown in FIG. 4.

The reverse bytes marking produces a bit vector, BRstart, indicating the first byte of a shadow branch. Together with the LengthIs vector, BRstart also identifies the last byte of a shadow branch. Knowing the first byte and last byte of a shadow branch, the opcode and target of the shadow branch can be extracted for insertion into BPB. While one primary focus may be on CALLs and RETURNs in some embodiments, other branch types can be identified in the same manner. Moreover, some embodiments split all the instruction bytes into different instructions. FIG. 4 shows marking just the first byte of the first cold instruction that precedes the entry address. But there are other ways one could mark up the bytes to split them into different instructions. For example, in the figure, one could have marked bytes 9-13 with "1". If there is another instruction before those bytes, they could have been marked with "2" and so on. Hence, one goal is to identify how to split the bytes into instructions. Further, even though in FIG. 4 only one instruction is marked, there could also be another 1-byte instruction before it starting at byte 8, because the LengthIs calculation says there is a 1-byte instruction starting at byte 8 which will then abut the instruction marked in the figure. Alternatively, there could a 2-byte instruction starting at byte 7. And yet another alternative, there could be a 3-byte instruction starting at byte 6. As a result, with reverse decode, there can be multiple possible sequences that will work, and logic would need to pick a sequence.

FIG. 5 illustrates a sample pseudocode for a reverse bytes marking algorithm, according to an embodiment. One goal of this algorithm is to expose all potential instruction chains that precede the line's entry address, such as mentioned with reference to FIG. 4. This is achieved by finding the first instruction in a chain that immediately precedes the entry address. If such an instruction exists, its length, given by LengthIs vector, is 'N' bytes away from the entry address. It is then verified whether the instruction is a CALL or a RETURN and the corresponding BRstart bit is set accordingly. The algorithm recursively discovers the remaining instructions in the chain assuming the previously discovered instruction is the new entry address.

Moreover, given an entry byte, it is possible that there can be a 1-byte instruction that precedes it, i.e., N=1, or a 2 bytes instruction that precedes it, i.e., N=2, etc. The algorithm in FIG. 5 picks the shortest possible instruction, but other algorithms are also possible.

As discussed with reference to FIG. 3, the "cold" CALLs and RETURNs discovered during predecode stage are inserted into BPB on a line fill. This is referred to herein as BPB allocation policy branch prefetch on fill (BPoF). Although all predecoded cold branches could be inserted in BPB on a fill, an embodiment considers the maximum number of cold branches to allocate in BPB using BPoF to be three, which covers about 93% of the cache lines, on average. This conclusion is reached assuming 64 byte cache lines. With larger or shorter lines, more or fewer branches may need to be filled. The remaining branches before the entry address can be ignored, although in a different scheme these branches could be inserted in the BPB as well. The entry address in the line, i.e., the branch miss-causing instruction (BMI), is excluded from the count in an embodiment since it is believed to degrade prefetch usefulness by up to 50% on average, if it is prefetched in the BPB among the three branches. These cold branches tend to have short prefetch-to-use time, e.g., just a few hundred executed uops are enough to capture about 65% of all cold branches, hinting at a small BPB size. An embodiment suggests a BPB of 192 entries could provide the best performance such as discussed with reference to FIGS. 6 and 7.

Figure 6:
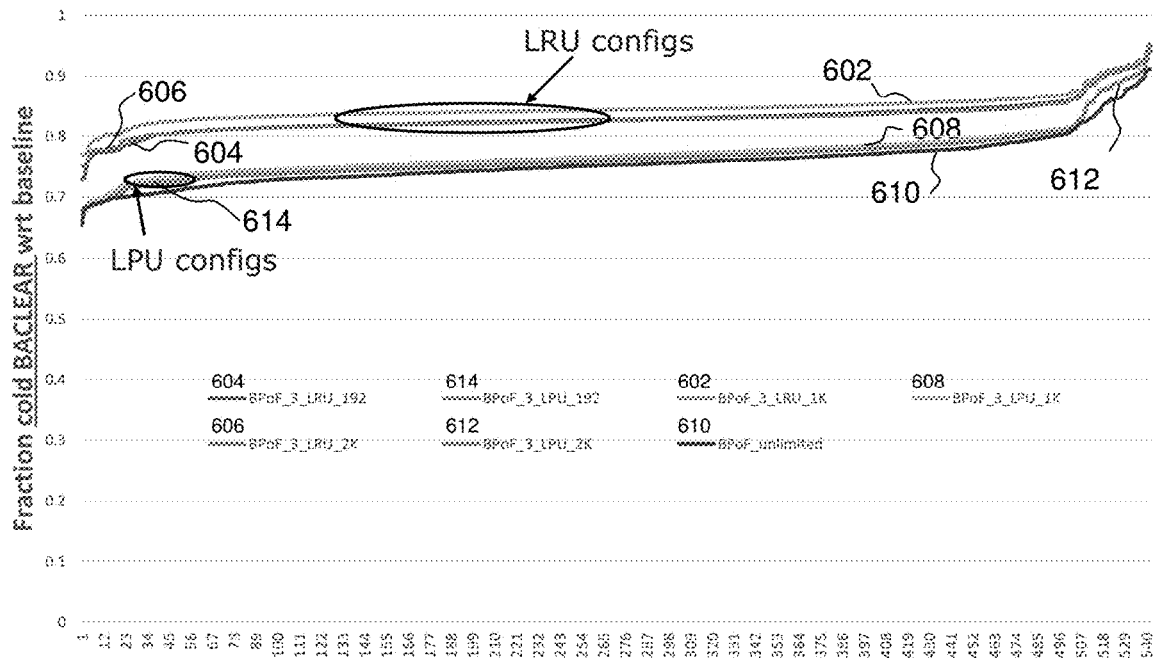
FIGS. 6 and 7 illustrate sample graphs of data for comparison of different branch prefetch buffer allocation/sizes and replacement policies, according to some embodiments.
Figure 7:
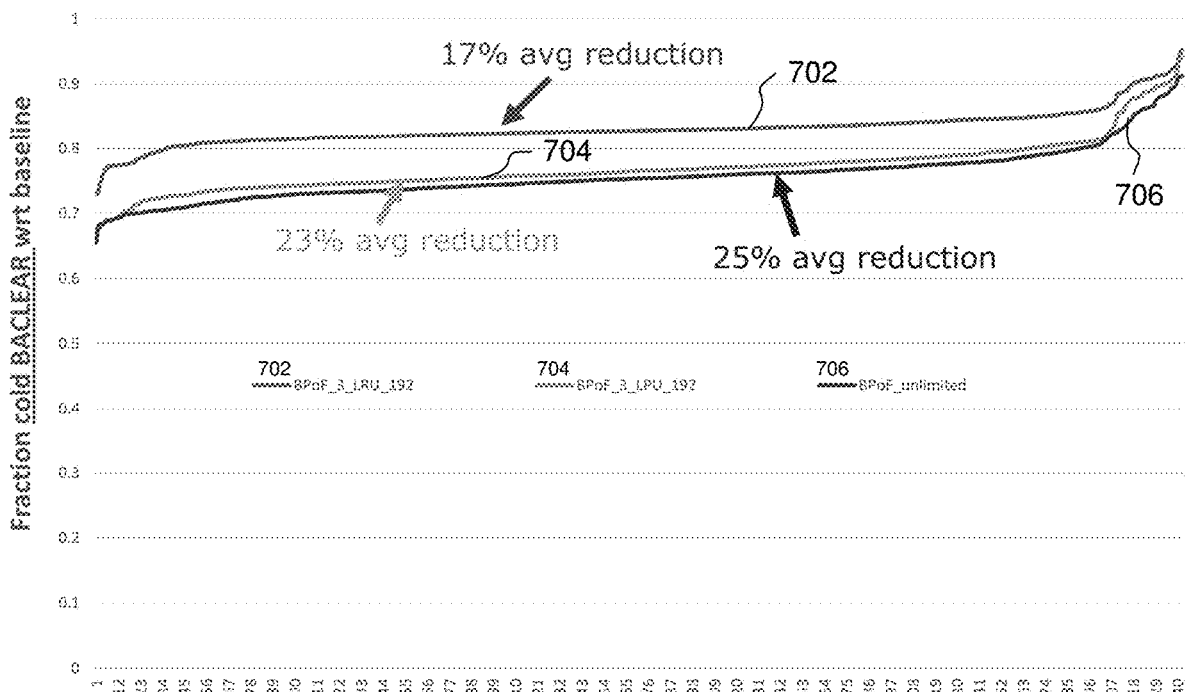

FIGS. 6 and 7 illustrates sample values for fraction of cold BACLEAR with respect to baseline, according to some embodiments. When a branch predictor unit/logic makes a prediction, it can predict both information that can be determined by decoding the instruction (i.e., static information) and information that can only be determined by executing a branch. As discussed herein, "BAClear" generally occurs when an instruction is decoded and it is detected that the branch predictor incorrectly predicted some of the static information. Hence, a BAClear indicates a branch resteer in response to the decoder decoding an instruction and the detection of a misprediction of the branch's static information. FIG. 6 shows that scaling BPB beyond 192 entries would provide little benefit. FIG. 7 compares Least Recently Used (LRU) vs. Largest-Prefetch-to-Use (LPU) replacement policies at 192 BPB entries. Hence, FIGS. 6 and 7 illustrates sample graphs of data for comparison of different branch prefetch buffer allocation/sizes and replacement policies, according to some embodiments.

In FIGS. 6 and 7, 602 refers to BPoF of 3 and LRU of 1 k, 604 refers to BPoF of 3 and LRU of 192, 606 refers to BPoF of 3 and LRU of 2 k, 608 refers to BPoF of 3 and LPU of 1 k, 610 refers to BPoF of unlimited, 612 refers to BPoF of 3 and LPU of 2 k, 614 refers to BPoF of 3 and LPU of 192, 702 refers to BPoF of 3 and LRU of 192, 704 refers to BPoF of 3 and LPU of 192, and 706 refers to BPoF of unlimited.

As mentioned before, cold branches tend to have a shorter prefetch-to-use time than other branches, which may be considered in light of alternative BPB replacement policies other than LRU. For example, Largest-Prefetch-to-Use time (LPU) may deliver a better performance than LRU by improving BPB hit rate by about 6% on average (as shown in FIG. 7). Under LPU replacement policy, the victim entry is the entry with largest elapsed time since prefetch occurred.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

FIG. 8A is a block diagram illustrating both an exemplary in-order pipeline and an exemplary register renaming, out-of-order issue/execution pipeline according to embodiments. FIG. 8B is a block diagram illustrating both an exemplary embodiment of an in-order architecture core and an exemplary register renaming, out-of-order issue/execution architecture core to be included in a processor according to embodiments. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a writemask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 890 includes logic to support a packed data instruction set extension (e.g., AVX1, AVX2), thereby allowing the operations used by many multimedia applications to be performed using packed data.

Figure 9:
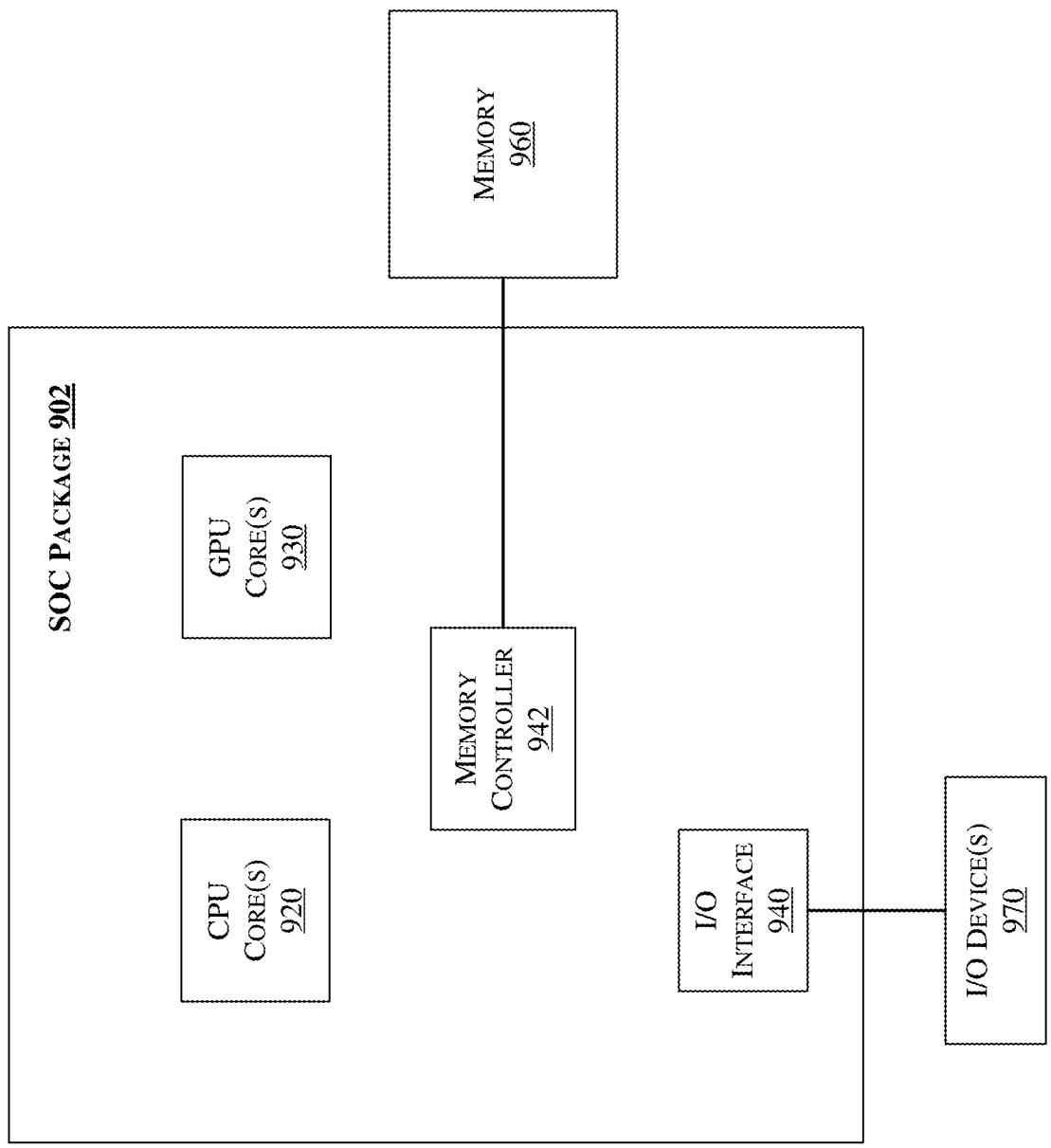
FIG. 9 illustrates a block diagram of an SOC (System On Chip) package in accordance with an embodiment.

FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
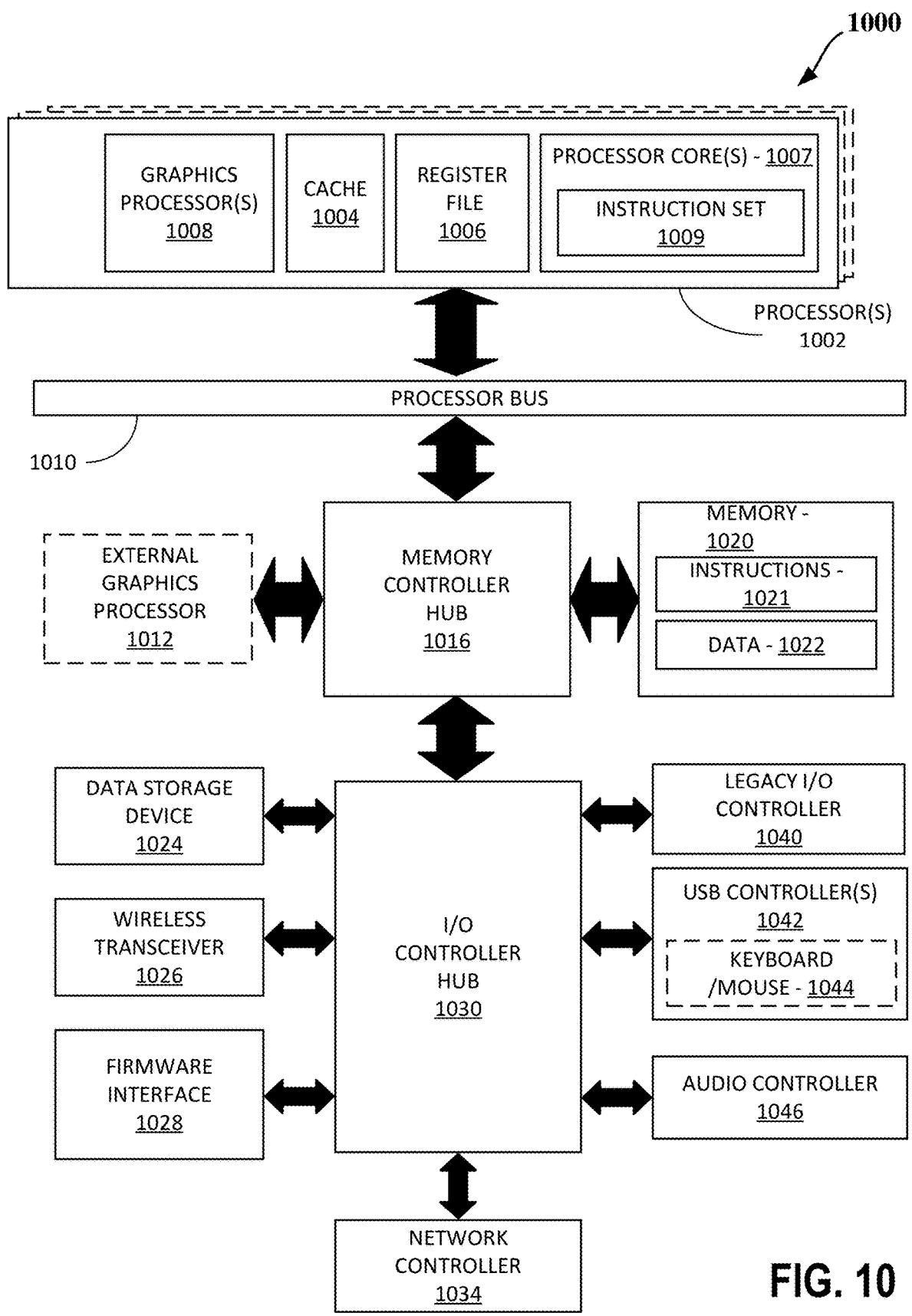
FIG. 10 is a block diagram of a processing system, according to an embodiment.

FIG. 10 is a block diagram of a processing system 1000, according to an embodiment. In various embodiments the system 1000 includes one or more processors 1002 and one or more graphics processors 1008, and may be a single processor desktop system, a multiprocessor workstation system, or a server system having a large number of processors 1002 or processor cores 1007. In on embodiment, the system 1000 is a processing platform incorporated within a system-on-a-chip (SoC or SOC) integrated circuit for use in mobile, handheld, or embedded devices.

An embodiment of system 1000 can include, or be incorporated within a server-based gaming platform, a game console, including a game and media console, a mobile gaming console, a handheld game console, or an online game console. In some embodiments system 1000 is a mobile phone, smart phone, tablet computing device or mobile Internet device. Data processing system 1000 can also include, couple with, or be integrated within a wearable device, such as a smart watch wearable device, smart eyewear device, augmented reality device, or virtual reality device. In some embodiments, data processing system 1000 is a television or set top box device having one or more processors 1002 and a graphical interface generated by one or more graphics processors 1008.

In some embodiments, the one or more processors 1002 each include one or more processor cores 1007 to process instructions which, when executed, perform operations for system and user software. In some embodiments, each of the one or more processor cores 1007 is configured to process a specific instruction set 1009. In some embodiments, instruction set 1009 may facilitate Complex Instruction Set Computing (CISC), Reduced Instruction Set Computing (RISC), or computing via a Very Long Instruction Word (VLIW). Multiple processor cores 1007 may each process a different instruction set 1009, which may include instructions to facilitate the emulation of other instruction sets. Processor core 1007 may also include other processing devices, such a Digital Signal Processor (DSP).

In some embodiments, the processor 1002 includes cache memory 1004. Depending on the architecture, the processor 1002 can have a single internal cache or multiple levels of internal cache. In some embodiments, the cache memory is shared among various components of the processor 1002. In some embodiments, the processor 1002 also uses an external cache (e.g., a Level-3 (L3) cache or Last Level Cache (LLC)) (not shown), which may be shared among processor cores 1007 using known cache coherency techniques. A register file 1006 is additionally included in processor 1002 which may include different types of registers for storing different types of data (e.g., integer registers, floating point registers, status registers, and an instruction pointer register). Some registers may be general-purpose registers, while other registers may be specific to the design of the processor 1002.

In some embodiments, processor 1002 is coupled to a processor bus 1010 to transmit communication signals such as address, data, or control signals between processor 1002 and other components in system 1000. In one embodiment the system 1000 uses an exemplary 'hub' system architecture, including a memory controller hub 1016 and an Input Output (I/O) controller hub 1030. A memory controller hub 1016 facilitates communication between a memory device and other components of system 1000, while an I/O Controller Hub (ICH) 1030 provides connections to I/O devices via a local I/O bus. In one embodiment, the logic of the memory controller hub 1016 is integrated within the processor.

Memory device 1020 can be a dynamic random access memory (DRAM) device, a static random access memory (SRAM) device, flash memory device, phase-change memory device, or some other memory device having suitable performance to serve as process memory. In one embodiment the memory device 1020 can operate as system memory for the system 1000, to store data 1022 and instructions 1021 for use when the one or more processors 1002 executes an application or process. Memory controller hub 1016 also couples with an optional external graphics processor 1012, which may communicate with the one or more graphics processors 1008 in processors 1002 to perform graphics and media operations.

In some embodiments, ICH 1030 enables peripherals to connect to memory device 1020 and processor 1002 via a high-speed I/O bus. The I/O peripherals include, but are not limited to, an audio controller 1046, a firmware interface 1028, a wireless transceiver 1026 (e.g., Wi-Fi, Bluetooth), a data storage device 1024 (e.g., hard disk drive, flash memory, etc.), and a legacy I/O controller 1040 for coupling legacy (e.g., Personal System 2 (PS/2)) devices to the system. One or more Universal Serial Bus (USB) controllers 1042 connect input devices, such as keyboard and mouse 1044 combinations. A network controller 1034 may also couple to ICH 1030. In some embodiments, a high-performance network controller (not shown) couples to processor bus 1010. It will be appreciated that the system 1000 shown is exemplary and not limiting, as other types of data processing systems that are differently configured may also be used. For example, the I/O controller hub 1030 may be integrated within the one or more processor 1002, or the memory controller hub 1016 and I/O controller hub 1030 may be integrated into a discreet external graphics processor, such as the external graphics processor 1012.

Figure 11:
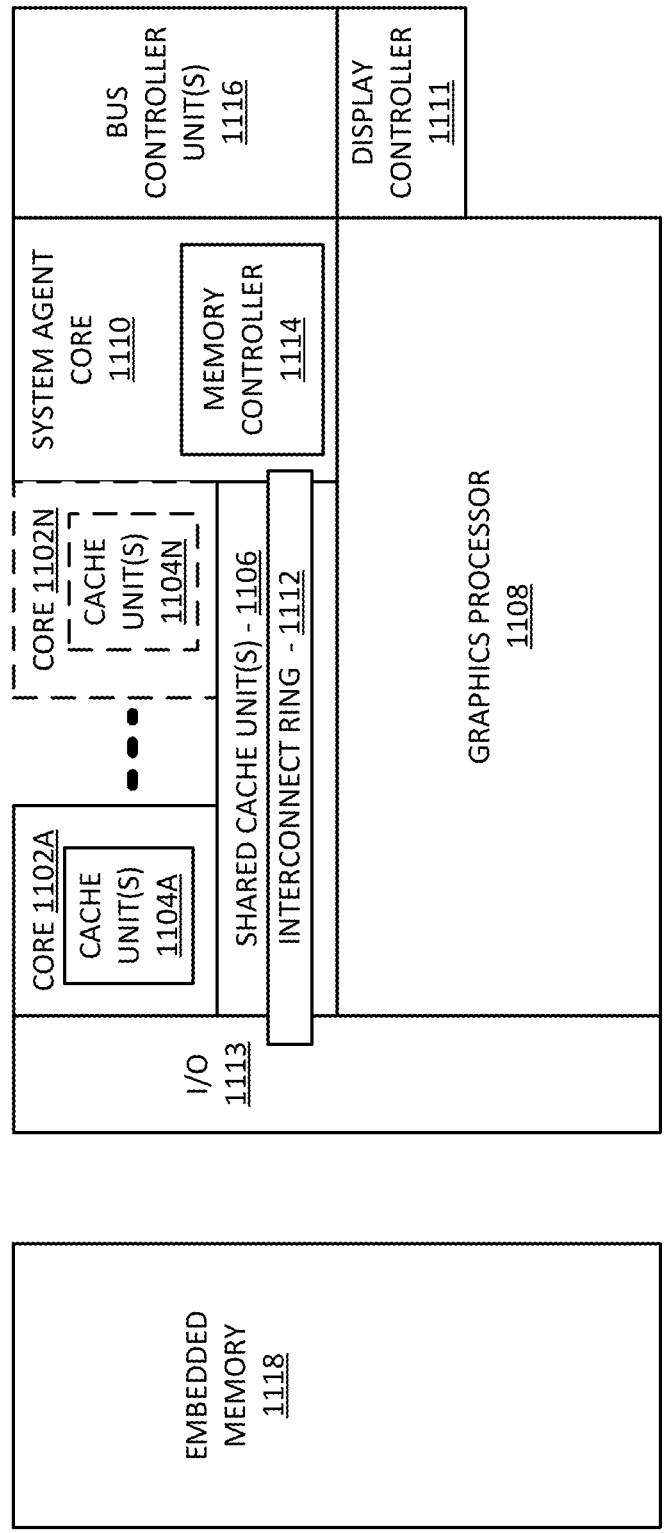
FIG. 11 is a block diagram of an embodiment of a processor having one or more processor cores, according to some embodiments.

FIG. 11 is a block diagram of an embodiment of a processor 1100 having one or more processor cores 1102A to 1102N, an integrated memory controller 1114, and an integrated graphics processor 1108. Those elements of FIG. 11 having the same reference numbers (or names) as the elements of any other figure herein can operate or function in any manner similar to that described elsewhere herein, but are not limited to such. Processor 1100 can include additional cores up to and including additional core 1102N represented by the dashed lined boxes. Each of processor cores 1102A to 1102N includes one or more internal cache units 1104A to 1104N. In some embodiments each processor core also has access to one or more shared cached units 1106.

The internal cache units 1104A to 1104N and shared cache units 1106 represent a cache memory hierarchy within the processor 1100. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1106 and 1104A to 1104N.

In some embodiments, processor 1100 may also include a set of one or more bus controller units 1116 and a system agent core 1110. The one or more bus controller units 1116 manage a set of peripheral buses, such as one or more Peripheral Component Interconnect buses (e.g., PCI, PCI Express). System agent core 1110 provides management functionality for the various processor components. In some embodiments, system agent core 1110 includes one or more integrated memory controllers 1114 to manage access to various external memory devices (not shown).

In some embodiments, one or more of the processor cores 1102A to 1102N include support for simultaneous multi-threading. In such embodiment, the system agent core 1110 includes components for coordinating and operating cores 1102A to 1102N during multi-threaded processing. System agent core 1110 may additionally include a power control unit (PCU), which includes logic and components to regulate the power state of processor cores 1102A to 1102N and graphics processor 1108.

In some embodiments, processor 1100 additionally includes graphics processor 1108 to execute graphics processing operations. In some embodiments, the graphics processor 1108 couples with the set of shared cache units 1106, and the system agent core 1110, including the one or more integrated memory controllers 1114. In some embodiments, a display controller 1111 is coupled with the graphics processor 1108 to drive graphics processor output to one or more coupled displays. In some embodiments, display controller 1111 may be a separate module coupled with the graphics processor via at least one interconnect, or may be integrated within the graphics processor 1108 or system agent core 1110.

In some embodiments, a ring based interconnect unit 1112 is used to couple the internal components of the processor 1100. However, an alternative interconnect unit may be used, such as a point-to-point interconnect, a switched interconnect, or other techniques, including techniques well known in the art. In some embodiments, graphics processor 1108 couples with the ring interconnect 1112 via an I/O link 1113.

The exemplary I/O link 1113 represents at least one of multiple varieties of I/O interconnects, including an on package I/O interconnect which facilitates communication between various processor components and a high-performance embedded memory module 1118, such as an eDRAM (or embedded DRAM) module. In some embodiments, each of the processor cores 1102 to 1102N and graphics processor 1108 use embedded memory modules 1118 as a shared Last Level Cache.

In some embodiments, processor cores 1102A to 1102N are homogenous cores executing the same instruction set architecture. In another embodiment, processor cores 1102A to 1102N are heterogeneous in terms of instruction set architecture (ISA), where one or more of processor cores 1102A to 1102N execute a first instruction set, while at least one of the other cores executes a subset of the first instruction set or a different instruction set. In one embodiment processor cores 1102A to 1102N are heterogeneous in terms of microarchitecture, where one or more cores having a relatively higher power consumption couple with one or more power cores having a lower power consumption. Additionally, processor 1100 can be implemented on one or more chips or as an SoC integrated circuit having the illustrated components, in addition to other components.

Figure 12:
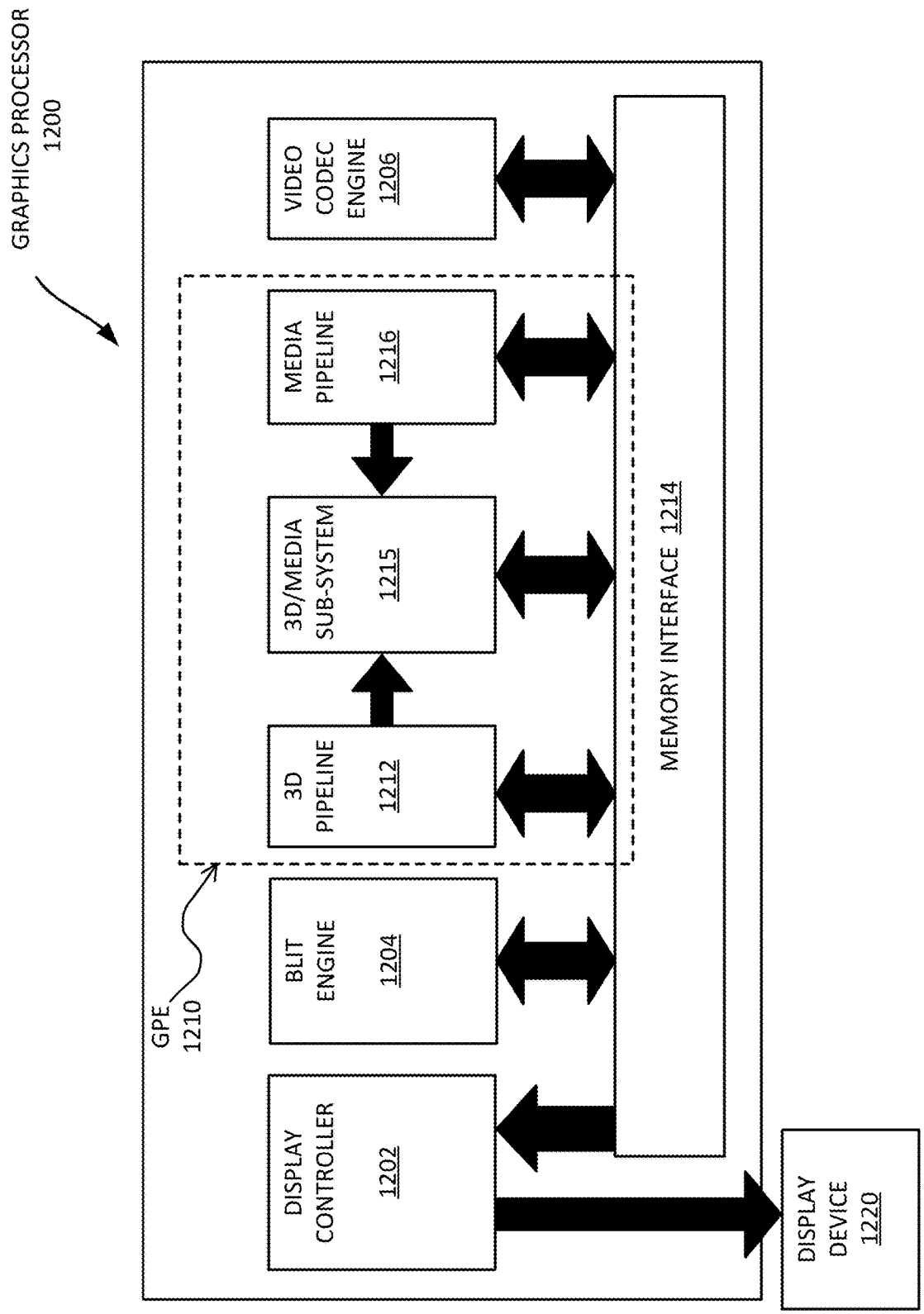
FIG. 12 is a block diagram of a graphics processor, according to an embodiment.

FIG. 12 is a block diagram of a graphics processor 1200, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1200 includes a memory interface 1214 to access memory. Memory interface 1214 can be an interface to local memory, one or more internal caches, one or more shared external caches, and/or to system memory.

In some embodiments, graphics processor 1200 also includes a display controller 1202 to drive display output data to a display device 1220. Display controller 1202 includes hardware for one or more overlay planes for the display and composition of multiple layers of video or user interface elements. In some embodiments, graphics processor 1200 includes a video codec engine 1206 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1200 includes a block image transfer (BLIT) engine 1204 to perform two-dimensional (2D) rasterizer operations including, for example, bit-boundary block transfers. However, in one embodiment, 12D graphics operations are performed using one or more components of graphics processing engine (GPE) 1210. In some embodiments, graphics processing engine 1210 is a compute engine for performing graphics operations, including three-dimensional (3D) graphics operations and media operations.

In some embodiments, GPE 1210 includes a 3D pipeline 1212 for performing 3D operations, such as rendering three-dimensional images and scenes using processing functions that act upon 3D primitive shapes (e.g., rectangle, triangle, etc.). The 3D pipeline 1212 includes programmable and fixed function elements that perform various tasks within the element and/or spawn execution threads to a 3D/Media sub-system 1215. While 3D pipeline 1212 can be used to perform media operations, an embodiment of GPE 1210 also includes a media pipeline 1216 that is specifically used to perform media operations, such as video post-processing and image enhancement.

In some embodiments, media pipeline 1216 includes fixed function or programmable logic units to perform one or more specialized media operations, such as video decode acceleration, video de-interlacing, and video encode acceleration in place of, or on behalf of video codec engine 1206. In some embodiments, media pipeline 1216 additionally includes a thread spawning unit to spawn threads for execution on 3D/Media sub-system 1215. The spawned threads perform computations for the media operations on one or more graphics execution units included in 3D/Media sub-system 1215.

In some embodiments, 3D/Media subsystem 1215 includes logic for executing threads spawned by 3D pipeline 1212 and media pipeline 1216. In one embodiment, the pipelines send thread execution requests to 3D/Media subsystem 1215, which includes thread dispatch logic for arbitrating and dispatching the various requests to available thread execution resources. The execution resources include an array of graphics execution units to process the 3D and media threads. In some embodiments, 3D/Media subsystem 1215 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: predecode circuitry to predecode an entry in a cache to generate a predecoded branch operation, the entry being associated with a cold branch operation, wherein the cold branch operation corresponds to an operation that is detected for a first time after storage in an instruction cache and wherein the cold branch operation remains undecoded since it is stored at a location other than a start of in a cache line prior to a subsequent location of a branch operation in the cache line and remains undecoded; and a Branch Prefetch Buffer (BPB) to store the predecoded branch operation in response to a cache line fill operation of the cold branch operation in an instruction cache. Example 2 includes the apparatus of example 1, wherein the predecode circuitry is to predecode one or more entries of the cache in reverse order starting with a byte immediately preceding a first byte of an entry address. Example 3 includes the apparatus of example 2, wherein the predecode circuitry is to predecode the one or more entries of the cache in two phases. Example 4 includes the apparatus of example 3, wherein the two phases comprise a first phase to calculate a length of an instruction corresponding to the cold branch operation and a second phase to mark a first byte of the instruction corresponding to the cold branch operation in reverse order starting with the byte immediately preceding the first byte of the entry address. Example 5 includes the apparatus of example 1, wherein the BPB is coupled to a Branch Target Buffer (BTB), wherein the BTB is to store information corresponding to one or more branches taken and their target addresses. Example 6 includes the apparatus of example 5, wherein upon a miss for a request directed to the BTB, the request is to be serviced by the BPB. Example 7 includes the apparatus of example 5, where upon a hit for a request directed to the BPB, a corresponding BPB entry is to be stored in the BTB. Example 8 includes the apparatus of example 1, wherein the BPB and a Branch Target Buffer (BTB) are to be looked up in parallel in response to a lookup request. Example 9 includes the apparatus of example 1, wherein the cache comprises a Mid-Level Cache (MLC) or a Level 2 (L2) cache. Example 10 includes the apparatus of example 1, wherein the predecoded branch operation is to be stored in the instruction cache. Example 11 includes the apparatus of example 1, wherein the cache line is stored in the cache. Example 12 includes the apparatus of example 1, wherein the BPB is to store 192 entries. Example 13 includes the apparatus of example 1, wherein the BPB is to allocate a maximum of three cold branches in response to the cache line fill operation in the instruction cache. Example 14 includes the apparatus of example 1, wherein a processor, having one or more processor cores, comprises one or more of the predecode circuitry, the BPB, and a Branch Target Buffer (BTB). Example 15 includes the apparatus of example 14, wherein the processor comprises a Graphics Processing Unit (GPU), having one or more graphics processing cores.

Example 16 includes a system comprising: memory to store one or more instructions; a processor, having one or more cores, to execute the one or more instructions; predecode circuitry to predecode an entry in a cache to generate a predecoded branch operation, the entry being associated with a cold branch operation, wherein the cold branch operation corresponds to an operation that is detected for a first time after storage in an instruction cache and wherein the cold branch operation remains undecoded since it is stored at a location in a cache line prior to a subsequent location of a branch operation in the cache line; and a Branch Prefetch Buffer (BPB) to store the predecoded branch operation in response to a cache line fill operation of the cold branch operation in an instruction cache. Example 17 includes the system of example 16, wherein the predecode circuitry is to predecode one or more entries of the cache starting with a byte immediately preceding a first byte of an entry address. Example 18 includes the system of example 17, wherein the predecode circuitry is to predecode the one or more entries of the cache in two phases. Example 19 includes the system of example 18, wherein the two phases comprise a first phase to calculate a length of an instruction corresponding to the cold branch operation and a second phase to mark a byte in reverse order starting with the byte immediately preceding the first byte of the entry address. Example 20 includes the system of example 16, wherein the BPB is coupled to a Branch Target Buffer (BTB), wherein the BTB is to store information corresponding to one or more branches taken and their target addresses.

Example 21 includes a method comprising: predecoding an entry in a cache to generate a predecoded branch operation, the entry being associated with a cold branch operation, wherein the cold branch operation corresponds to an operation that is detected for a first time after storage in an instruction cache and wherein the cold branch operation remains undecoded since it is stored at a location in a cache line prior to a subsequent location of a branch operation in the cache line; and storing the predecoded branch operation in a Branch Prefetch Buffer (BPB) in response to a cache line fill operation of the cold branch operation in an instruction cache. Example 22 includes the method of example 21, further comprising predecoding one or more entries of the cache starting with a byte immediately preceding a first byte of an entry address. Example 23 includes the method of example 22, further comprising predecoding the one or more entries of the cache in two phases. Example 24 includes the method of example 21, further comprising storing information corresponding to one or more branches taken and their target address in a Branch Target Buffer (BTB) coupled to the BPB. Example 25 includes the method of example 21, further comprising looking up of the BPB and a Branch Target Buffer (BTB) in parallel in response to a lookup request.

Example 26 includes an apparatus comprising means to perform a method as set forth in any preceding example. Example 27 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
predecode circuitry to predecode an entry in a cache to generate a predecoded branch operation, the entry being associated with a cold branch operation, wherein the cold branch operation corresponds to an operation that is detected for a first time after storage in an instruction cache and wherein the cold branch operation remains undecoded since it is stored at a location in a cache line prior to a subsequent location of a branch operation in the cache line; and
a Branch Prefetch Buffer (BPB) to store the predecoded branch operation in response to a cache line fill operation of the cold branch operation in an instruction cache.

2. The apparatus of claim 1, wherein the predecode circuitry is to predecode one or more entries of the cache starting with a byte immediately preceding a first byte of an entry address.

3. The apparatus of claim 2, wherein the predecode circuitry is to predecode the one or more entries of the cache in two phases.

4. The apparatus of claim 3, wherein the two phases comprise a first phase to calculate a length of an instruction corresponding to the cold branch operation and a second phase to mark a first byte of the instruction corresponding to the cold branch operation in reverse order starting with the byte immediately preceding the first byte of the entry address.

5. The apparatus of claim 1, wherein the BPB is coupled to a Branch Target Buffer (BTB), wherein the BTB is to store information corresponding to one or more branches taken and their target addresses.

6. The apparatus of claim 5, wherein upon a miss for a request directed to the BTB, the request is to be serviced by the BPB.

7. The apparatus of claim 5, where upon a hit for a request directed to the BPB, a corresponding BPB entry is to be stored in the BTB.

8. The apparatus of claim 1, wherein the BPB and a Branch Target Buffer (BTB) are to be looked up in parallel in response to a lookup request.

9. The apparatus of claim 1, wherein the cache comprises a Mid-Level Cache (MLC) or a Level 2 (L2) cache.

10. The apparatus of claim 1, wherein the predecoded branch operation is to be stored in the instruction cache.

11. The apparatus of claim 1, wherein the cache line is stored in the cache.

12. The apparatus of claim 1, wherein the BPB is to store 192 entries.

13. The apparatus of claim 1, wherein the BPB is to allocate a maximum of three cold branches in response to the cache line fill operation in the instruction cache.

14. The apparatus of claim 1, wherein a processor, having one or more processor cores, comprises one or more of the predecode circuitry, the BPB, and a Branch Target Buffer (BTB).

15. The apparatus of claim 14, wherein the processor comprises a Graphics Processing Unit (GPU), having one or more graphics processing cores.

16. A system comprising:
memory to store one or more instructions;
a processor, having one or more cores, to execute the one or more instructions;
predecode circuitry to predecode an entry in a cache to generate a predecoded branch operation, the entry being associated with a cold branch operation, wherein the cold branch operation corresponds to an operation that is detected for a first time after storage in an instruction cache and wherein the cold branch operation remains undecoded since it is stored at a location in a cache line prior to a subsequent location of a branch operation in the cache line; and
a Branch Prefetch Buffer (BPB) to store the predecoded branch operation in response to a cache line fill operation of the cold branch operation in an instruction cache.

17. The system of claim 16, wherein the predecode circuitry is to predecode one or more entries of the cache starting with a byte immediately preceding a first byte of an entry address.

18. The system of claim 17, wherein the predecode circuitry is to predecode the one or more entries of the cache in two phases.

19. The system of claim 18, wherein the two phases comprise a first phase to calculate a length of an instruction corresponding to the cold branch operation and a second phase to mark a byte in reverse order starting with the byte immediately preceding the first byte of the entry address.

20. The system of claim 16, wherein the BPB is coupled to a Branch Target Buffer (BTB), wherein the BTB is to store information corresponding to one or more branches taken and their target addresses.

* * * * *